United States Patent
Noguchi et al.

(10) Patent No.: US 8,742,046 B2
(45) Date of Patent: Jun. 3, 2014

(54) MALEIMIDE COPOLYMER, PROCESS FOR THE PRODUCTION THEREOF, AND HEAT RESISTANT RESIN COMPOSITIONS CONTAINING SAME

(75) Inventors: Tetsuo Noguchi, Ichihara (JP); Koichi Ozawa, Ichihara (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 303 days.

(21) Appl. No.: 13/144,509

(22) PCT Filed: Jan. 15, 2010

(86) PCT No.: PCT/JP2010/050384
§ 371 (c)(1),
(2), (4) Date: Sep. 12, 2011

(87) PCT Pub. No.: WO2010/082617
PCT Pub. Date: Jul. 22, 2010

(65) Prior Publication Data
US 2011/0319567 A1 Dec. 29, 2011

(30) Foreign Application Priority Data

Jan. 16, 2009 (JP) ................................ 2009-007380

(51) Int. Cl.
C08F 212/04 (2006.01)
C08F 8/32 (2006.01)
C08F 222/04 (2006.01)
C08F 222/40 (2006.01)
C08L 25/12 (2006.01)
C08L 35/06 (2006.01)
C08L 51/04 (2006.01)
C08L 55/02 (2006.01)

(52) U.S. Cl.
USPC ........ 526/258; 526/318.2; 526/326; 525/217; 525/232; 525/238; 525/240; 525/241

(58) Field of Classification Search
USPC ............... 526/258, 318.2, 326; 525/217, 232, 525/238, 240, 241
See application file for complete search history.

(56) References Cited

U.S. PATENT DOCUMENTS

| | | | |
|---|---|---|---|
| 3,840,499 A * | 10/1974 | Di Giulio | 525/378 |
| 4,381,373 A | 4/1983 | Ikuma | |
| 4,404,322 A | 9/1983 | Saito et al. | |
| 5,559,187 A | 9/1996 | Maeda et al. | |
| 6,599,978 B1 | 7/2003 | Shikisai et al. | |
| 8,124,703 B2 * | 2/2012 | Sohn et al. | 526/262 |
| 2007/0093610 A1 * | 4/2007 | Kim et al. | 525/333.3 |

FOREIGN PATENT DOCUMENTS

| | | |
|---|---|---|
| EP | 0 541 797 | 5/1990 |
| JP | 57-98536 | 6/1982 |
| JP | 57-125241 | 8/1982 |
| JP | 2-51514 | 2/1990 |
| JP | 2000-248010 | 9/2000 |
| JP | 2003-41080 | 2/2003 |
| JP | 2004-346149 | 12/2004 |
| JP | 2006-176578 | 7/2006 |
| SU | 1452812 A1 | 1/1989 |
| WO | WO 99/60040 | 11/1999 |

OTHER PUBLICATIONS

Chinese Office Action dated Aug. 16, 2012, issued in corresponding Chinese Application No. 201080004728.1.
European search report for Application No. 10731286.0-1304/2388282 PCT/JP2010050384; mailed Feb. 21, 2013.
International Search Report mailed Apr. 13, 2010 in International Patent Application No. PCT/JP2010/050384.
Office Action of Jul. 8, 2013 from Russian Patent Office with English Translation.

* cited by examiner

*Primary Examiner* — Nathan M Nutter
(74) *Attorney, Agent, or Firm* — Stein IP, LLC

(57) ABSTRACT

Provided is a maleimide copolymer which exhibits an excellent hue, an effect of imparting high heat resistance, and excellent kneadability. Specifically provided is a maleimide copolymer which comprises 50 to 60 mass % of a styrene monomer unit, 30 to 50 mass % of a maleimide monomer unit, and 0 to 10 mass % of an unsaturated dicarboxylic anhydride monomer unit, and which has a weight-average molecular weight (Mw) of 90,000 to 130,000 and a residual maleimide monomer content of 300 ppm or lower.

7 Claims, No Drawings

MALEIMIDE COPOLYMER, PROCESS FOR THE PRODUCTION THEREOF, AND HEAT RESISTANT RESIN COMPOSITIONS CONTAINING SAME

CROSS-REFERENCE TO RELATED APPLICATIONS

This application claims the benefit of PCT International Patent Application No. PCT/JP/2010/050384 filed Jan. 15, 2010, and Japanese Patent Application No. 2009-007380, filed Jan. 16, 2009, in the Japanese Patent Office, the disclosures of which are incorporated herein by reference.

BACKGROUND OF THE INVENTION

1. Field of the Invention

The present invention relates to a maleimide copolymer, a production method thereof, and a heat-resistant resin composition containing the copolymer.

2. Description of the Related Art

In order to improve the heat-resistance of conventional ABS resins etc., maleimide copolymers have been used as heat-resistance imparting materials (Patent Document 1 and Patent Document 2). However, due to the unpolymerized residual maleimide monomers, these maleimide copolymers have a yellow hue, causing the heat-resistant ABS resin compositions comprising the maleimide monomers to also take on a hue with a yellow tinge, so there were the problems of the color appearing unnatural and poor colorability.

In view of these problems, Patent Document 3 proposes a method of reducing residual maleimide monomers by adding liquid polybutadiene when producing a maleimide copolymer. Additionally, Patent Document 4 proposes a heat-resistance imparting material composed of a maleimide copolymer, an AS resin and a specific organic phosphorus compound.

Patent Document 1: JP-A S57-98536
Patent Document 2: JP-A S57-125241
Patent Document 3: JP-A2006-176578
Patent Document 4: JP-A 2003-41080

SUMMARY OF THE INVENTION

However, the conventional art described in the above documents had room for improvement, for example, as described below.

First, according to the art described in Patent Document 3, since the heat-resistance of the maleimide copolymer is high, the processing temperature also tends to be higher, resulting in cases of liquid polybutadiene becoming colored or thermally decomposed, and therefore there was room for further improvement. Moreover, when knead mixing a maleimide copolymer and an ABS resin to make a heat-resistant resin composition, if the melt viscosity of the maleimide copolymer is too high, it is difficult to achieve even mixing, and due to the poor dispersion of the maleimide copolymer, molding tends to be poor, and the physical properties may be lowered, so this feature could also be further improved. Additionally, when using a biaxial extruder of a screw constitution with a strong kneading efficiency to achieve even mixing, the resin temperature may need to be increased to around the thermal decomposition temperature of the ABS resin, and as a result of which, the obtained heat-resistant resin composition may have a poor hue and poor physical properties, so there was room for improvement for this feature as well.

Second, according to the art described in Patent Document 4, since an additional step of knead mixing and addition of an organic phosphorous compound are required, the costs are increased, and the inclusion of an AS resin could result in an insufficient heat-resistance effect, so there was room for further improvement.

According to the present invention, a maleimide copolymer comprising a styrene monomer unit, a maleimide monomer unit and an unsaturated carboxylic anhydride monomer unit is provided. Moreover, the maleimide copolymer comprises 50 to 60 mass % of the styrene monomer unit, 30 to 50 mass % of the maleimide monomer unit and 0 to 10 mass % of the unsaturated carboxylic anhydride monomer unit. Additionally, in the maleimide copolymer, the weight average molecular weight of the maleimide copolymer is within a range of 90,000 to 130,000. Further, in the maleimide copolymer, the residual maleimide monomer content in the maleimide copolymer is 300 ppm or lower.

Since the proportions of the styrene monomer unit, the maleimide monomer unit and the unsaturated dicarboxylic anhydride monomer unit constituting the maleimide copolymer are within the specific ranges, and the weight average molecular weight of the maleimide copolymer and the residual maleimide monomer content are within the specific ranges, a maleimide copolymer with an excellent hue, a high heat-resistance imparting effect and an excellent kneadability can be obtained.

Additionally, the present invention provides a method for producing a maleimide copolymer comprising a step of generating a styrene/unsaturated dicarboxylic anhydride copolymer by polymerization by adding, to a mixed solution mainly comprising a total amount of a styrene monomer and a portion of an unsaturated dicarboxylic anhydride, continuously or in batches, the remainder of the unsaturated carboxlic anhydride, and a step of generating a maleimide copolymer by imidizing the styrene/unsaturated dicarboxylic anhydride copolymer by a primary amine.

According to the method, since a styrene/unsaturated dicarboxylic anhydride copolymer is generated by a specific polymerization method, and then a maleimide copolymer is further generated by a specific imidization method, it is possible to productively obtain a maleimide copolymer with an excellent hue, a high heat-resistance imparting effect and an excellent kneadability using a simple process.

Moreover, the present invention provides a heat-resistant resin composition comprising a maleimide copolymer and another type of resin, for example, one or more resins selected from the group consisting of ABS resins, AS resins, AES resins and AAS resins.

By using the maleimide copolymer of the present invention as a heat-resistance imparting material added to an AS resin, ABS resin, AES resin or AAS resin in the heat-resistant resin composition, it is possible to obtain a heat-resistant resin composition with a good hue, an excellent balance of physical properties with respect to heat-resistance, impact-resistance and fluidity and a beautiful appearance when molded.

DETAILED DESCRIPTION OF THE EMBODIMENTS

<Explanation of Terminology>

In the present specification, "to" shall mean "at least" and "at most", inclusive of the upper limit and lower limit. For example, the description "A to B" shall mean at least A and at most B. Moreover, "comprising" shall cover "essentially consisting of" and "consisting of".

Herebelow, embodiments of the present invention shall be explained in detail.

<Maleimide Copolymer>

The present embodiment relates to a maleimide copolymer with an excellent hue. The maleimide copolymer of the present embodiment is a copolymer comprising a styrene monomer unit, a maleimide monomer unit and an unsaturated carboxylic anhydride monomer unit as the main monomer units. Since the maleimide copolymer of the present embodiment comprises these styrene monomer unit, maleimide monomer unit and unsaturated dicarboxylic anhydride monomer unit such that they fulfill the specific conditions and proportions described below, it is an excellent maleimide copolymer with a good balance of hue, heat-resistance imparting effect and kneadability, which are in general difficult to achieve at once due to their trade-off relationship with each other.

There are no particular limitations on the structure of the maleimide copolymer, and a copolymer of an arbitrary structure comprising a styrene monomer unit, a maleimide monomer unit and an unsaturated carboxylic anhydride monomer unit may be used. That is, while copolymers can be roughly categorized into four types of structures: random copolymer, alternating copolymer, periodic copolymer and block copolymer, and a type of block copolymer is a graft copolymer (a copolymer of a branched structure in which a heterologous branched polymer chain is joined to a polymer chain forming the backbone), it may be any of these structures.

(i) Styrene Monomer Unit

There are no particular limitations on the styrene monomer unit used in the present embodiment and any conventionally known styrene monomer unit may be used. However, when considering the availability and the kneadability and compatibility with ABS resins etc., styrene monomer units such as styrene, α-methyl styrene, o-methyl styrene, m-methyl styrene, p-methyl styrene, t-butyl styrene and chlorostyrene may be given as examples, and when considering the kneadability and compatibility with ABS resins etc., styrene is particularly preferred among them. Moreover, it may be a mixture of two or more of these styrene monomer units. These styrene monomer units may be, for example, produced using raw materials comprising or consisting of corresponding monomer units.

(ii) Maleimide Monomer Unit

There are no particular limitations on the maleimide monomer unit used in the present embodiment and any conventionally known maleimide monomer unit may be used. However, when considering the availability and heat-resistance imparting effect, maleimide monomer units including N-alkyl maleimides such as N-methyl maleimide, N-butyl maleimide and N-cyclohexyl maleimide; and N-aryl maleimides such as N-phenyl maleimide, N-chlorophenyl maleimide, N-methyl phenyl maleimide, N-methoxy phenyl maleimide and N-tribromophenyl maleimide may be given as examples, and when considering the heat-resistance imparting effect, N-cyclohexyl maleimide and N-phenyl maleimide are particularly preferred among them. Moreover, it may be a mixture of two or more of these maleimide monomer units. These maleimide monomer units may be, for example, produced using raw ingredients comprising or consisting of corresponding monomer units, or by imidizing corresponding unsaturated dicarboxylic acid monomer units by a primary amine.

(iii) Unsaturated Dicarboxylic Anhydride Monomer Unit

There are no particular limitations on the unsaturated dicarboxylic anhydride monomer unit used in the present embodiment and any conventionally known unsaturated dicarboxylic anhydride monomer unit may be used. However, when considering the availability and compatibility with ABS resins etc., anhydrides of, for example, maleic acid, itaconic acid, citraconic acid and aconitic acid may be given, and when considering the compatibility with ABS resins etc., maleic anhydride is particularly preferred among them. Moreover, it may be a mixture of two or more of these unsaturated dicarboxylic anhydride monomer units. These unsaturated dicarboxylic anhydride monomer units may be, for example, produced using raw materials comprising or consisting of corresponding monomer units.

(iv) Other Monomer Units

The maleimide copolymer of the present embodiment may comprise a copolymerizable vinyl monomer unit such as a monomer unit of, for example, acrylonitrile, methacrylonitrile, acrylic acid, methyl acrylate, ethyl acrylate, n-butyl acrylate, 2-ethylhexyl acrylate, methacrylic acid, methyl methacrylate, ethyl methacrylate, n-butyl methacrylate or 2-ethylhexyl methacrylate at less than 5 mass % when making the total mass of the maleimide copolymer 100 mass %. This is because as long as these vinyl monomer units are less than 5 mass %, the effects of the present invention will not be compromised.

(v) Proportions of Monomer Units

The constituting units of the maleimide copolymer of the present embodiment are preferably 50 to 60 mass % styrene monomer units, 30 to 50 mass % maleimide monomer units and 0 to 10 mass % unsaturated dicarboxylic anhydride monomer units, and are in particular preferably 50 to 59 mass % styrene monomer units, 35 to 49.5 mass % maleimide monomer units and 0.5 to 6 mass % unsaturated dicarboxylic anhydride monomer units.

The styrene monomer units are preferably at most 60 mass % or 59 mass % because the heat-resistance imparting effect will be improved, and the maleimide monomer units are preferably at most 50 mass % or 49.5 mass % because the melt viscosity will not be too high and a good kneadability can be maintained. Moreover, the unsaturated dicarboxylic anhydride monomer units are preferably at most 10 mass % or 6 mass % because a good thermal stability can be maintained and the generation of decomposition gas during thermal processing can be suppressed.

On the other hand, the styrene monomer units are preferably at least 50 mass % because the melt viscosity will not be too high and a good kneadability can be maintained, and the maleimide monomer units are preferably at least 30 mass % or 35 mass % because a good heat-resistance imparting effect can be obtained. Moreover, the unsaturated dicarboxylic anhydride monomer units are preferably at least 0 mass % or 0.5 mass % because the compatibility with ABS resins etc. will be improved and a heat-resistant resin composition with an excellent balance of physical properties can be obtained.

(vi) Glass Transition Temperature

It is further preferred that the constituting units of the maleimide copolymer of the present embodiment be within the above-given ranges and the glass transition temperature be within a range of 175 to 190° C., because the heat-resistance imparting effect and kneadability will be particularly excellent. Additionally, the glass transition temperature of the maleimide copolymer of the present embodiment is measured by DSC, and was measured under the below-described measurement conditions.

Device name: Robot DSC6200 manufactured by Seiko Instruments Inc.

Rate of temperature increase: 10° C./min.

(vii) Weight Average Molecular Weight (Mw)

The maleimide copolymer of the present embodiment has a weight average molecular weight (Mw) of preferably 90,000 to 130,000 and particularly preferably 100,000 to 130,000. The Mw is preferably at least 90,000 because the impact strength of the heat-resistant resin obtained by kneading with an ABS resin etc. will be improved. The Mw is preferably at most 130,000 because the melt viscosity will not be too high and a good kneadability can be maintained.

Additionally, the Mw of the maleimide copolymer of the present embodiment is the polystyrene-equivalent Mw as measured by GPC, and was measured under the below-described measurement conditions.

Device name: SYSTEM-21 Shodex (manufactured by Showa Denko K. K.)
Column: three PL gel MIXED-B in series
Temperature: 40° C.
Detection: differential refractive index
Solvent: tetrahydrofuran
Concentration: 2 mass %
Standard Curve: generated using standard polystyrenes (PS) (manufactured by PL), polystyrene-equivalent Mw
(viii) Residual Maleimide Monomer Content The residual maleimide monomer content comprised in the maleimide copolymer of the present embodiment is at most 300 ppm, preferably at most 250 ppm and more preferably at most 200 ppm. The residual maleimide monomer content is preferably at most 300 ppm because a good hue can be maintained.

Additionally, the residual maleimide monomer content comprised in the maleimide copolymer of the present embodiment was measured under the below-described measurement conditions.

Device name: GC-2010 (manufactured by Shimadzu Corporation)
Column: capillary column DB-5MS (phenylallene polymer)
Temperature: inlet 280° C., detector 280° C.
Programmed temperature analysis is performed at a (initial) column temperature of 80° C.
(Conditions for programmed temperature analysis)
80° C.: hold for 12 min.
80 to 280° C.: increase temperature at 20° C./min. for 10 min.
280° C.: hold for 10 min.
Detector: FID
Procedure: Dissolve 0.5 g of a sample in 5 ml of a 1,2-dichloroethane solution (0.014 g/L) containing undecane (internal standard material). Then add 5 ml n-hexane and shake for 10 to 15 min. using a shaker to precipitate. After precipitating and depositing the polymer, inject only the supernatant into the GC. From the obtained peak area of the maleimide monomer, calculate a quantitative value using a coefficient obtained from the internal standard material.

<Method for Producing a Maleimide Copolymer>

There are no particular limitations on the mode of polymerization of the maleimide copolymer of the present embodiment, which can be produced by a conventionally known method such as solution polymerization or bulk polymerization. However, when considering that a desired maleimide copolymer with a more uniform copolymerization association can be obtained by polymerization by adding the components in batches, solution polymerization is more preferred. Additionally, the solvent used in solution polymerization of the maleimide copolymer of the present embodiment is preferably non-polymerizable, considering that such a solvent rarely results in by-products and has few adverse effects. Further, the polymerization process of the maleimide copolymer of the present embodiment may be any of batch polymerization, semibatch polymerization and continuous polymerization processes.

There are no particular limitations on the method for polymerizing the maleimide copolymer of the present embodiment. However, it is preferably obtained by radical polymerization in view of the capability to productively generate copolymers by a simple process. Moreover, while there are no particular limitations on the polymerization initiator used in the polymerization reaction of the maleimide copolymer of the present embodiment, when considering the availability and ease to control the reaction, for example, a conventionally known azo compound such as azobisisobutyronitrile, azobiscyclohexanecarbonitrile, azobismethylpropionitrile or azobismethylbutyronitrile; or a conventionally known organic peroxide such as benzoyl peroxide, t-butyl peroxybenzoate, 1,1-bis(t-butylperoxy)-3,3,5-trimethylcyclohexane, t-butyl peroxy isopropyl monocarbonate, t-butyl peroxy-2-ethylhexanoate, di-t-butyl peroxide, dicumyl peroxide or ethyl-3,3-di-(t-butylperoxy)butylate may be used. Two or more of these polymerization initiators may be used in conjunction. Additionally, in view of the control of the reaction rate of polymerization and the degree of conversion, it is preferred that a substance commonly used in conventional production of styrene resins, for example, an organic peroxide or azo compound with a ten-hour half-life temperature of 70 to 120° C., be used.

While there are no particular limitations on the amount of the polymerization initiator used, it is preferably used in 0.1 to 1.5 parts by mass, and more preferably 0.1 to 1.0 parts by mass, per 100 parts by mass of the monomer units in total. The amount of the polymerization initiator used is preferably at least 0.1 parts by mass because a sufficient polymerization rate can be obtained. On the other hand, by keeping the amount of the polymerization initiator used to at most 1.5 parts by mass, the polymerization rate can be suppressed, so the reaction can be controlled easily and the target molecular weight of the maleimide copolymer can be achieved easily.

A chain transfer agent may be used in the production of the maleimide copolymer of the present embodiment. While there are no particular limitations on the chain transfer agent used, when considering the availability and ease to control molecular weight, a conventionally known chain transfer agent such as n-dodecyl mercaptan, t-dodecyl mercaptan or 2,4-diphenyl-4-methyl-1-pentene may be used. There are no particular limitations on the amount of the chain transfer agent used as long as it is within a range that allows the target molecular weight of the maleimide copolymer to be obtained. However, it is preferably used in 0.1 to 0.8 parts by mass, and more preferably 0.15 to 0.5 parts by mass, per 100 parts by mass of the monomer units in total. When the amount of the chain transfer agent used is at least 0.1 parts by mass and at most 0.8 parts by mass, the target molecular weight of the maleimide copolymer can be easily obtained.

While there are no particular limitations on the type of non-polymerizable solvent used in the solution polymerization of the maleimide copolymer of the present embodiment, when considering, for example, availability and solubility of the copolymer, there are ketones such as acetone, methyl ethyl ketone, methyl isobutyl ketone and acetophenone; ethers such as tetrahydrofuran and 1,4-dioxane; aromatic hydrocarbons such as benzene, toluene, xylene and chlorobenzene; and solvents such as N,N-dimethyl formamide, dimethylsulfoxide and N-methyl-2-pyrrolidone. Due to the ease of solvent removal when devolatilizing and recovering the maleimide copolymer, methyl ethyl ketone and methyl isobutyl ketone are particularly preferred.

As the method of introducing a maleimide monomer unit, there is the method in which a maleimide monomer and a styrene monomer are copolymerized (direct method), or the method in which an unsaturated dicarboxylic anhydride and a styrene monomer are pre-polymerized, then the unsaturated dicarboxylic anhydride group is reacted with a primary amine to convert the unsaturated dicarboxylic anhydride group to a maleimide monomer unit (subsequent imidization method). The subsequent imidization method is preferred because the residual maleimide monomer content in the copolymer will be low.

While there are no particular limitations on the primary amine used in the subsequent imidization method, when considering the ease of accessibility, alkyl amines such as methylamine, ethylamine, n-propylamine, isopropylamine, n-butylamine, n-pentylamine, n-hexylamine, n-octylamine, cyclohexylamine and decylamine, chloro- or bromo-substituted alkylamines, and aromatic amines such as aniline, toluidine and naphthylamine may be given as examples. However, in view of the heat-resistance imparting properties, reactivity and ease of handling, aniline and cyclohexylamine are particularly preferred among them. Additionally, the primary amines may be used alone or in a combination of two or more. Moreover, while the amount of the primary amine added is not particularly limited, it is preferably 0.7 to 1.1 molar equivalents, and more preferably 0.85 to 1.05 molar equivalents, to the unsaturated dicarboxylic anhydride group. When the mount of the primary amine added is at least 0.7 molar equivalents or 0.85 molar equivalents, the unsaturated dicarboxylic anhydride monomer unit in the maleimide copolymer can be kept at 10 mass % or lower, and a good thermal stability can be maintained. Additionally, it is preferably at most 1.1 molar equivalents or 1.05 molar equivalents because the residual primary amine content in the maleimide copolymer will be low.

When introducing a maleimide monomer unit by the subsequent imidization method, a catalyst may be used as necessary to improve the dehydrocyclization reaction in the reaction between the primary amine and unsaturated dicarboxylic anhydride group, especially in the reaction in which the unsaturated dicarboxylic anhydride group is converted to a maleimide group. While the type of catalyst is not particularly limited, for example, a tertiary amine may be used. While there are no particular limitations on the tertiary amine, trimethylamine, triethylamine, tripropylamine, tributylamine, N,N-dimethylaniline and N,N-diethylaniline may be given as examples.

The amount of the tertiary amine added is not particularly limited. However, in the interest of productivity, it is preferably at least 0.01 molar equivalents to the unsaturated dicarboxylic anhydride group.

The temperature of the imidization reaction in the present embodiment is preferably 100 to 250° C. and more preferably 120 to 200° C. Since the reaction rate is enhanced when the temperature of the imidization reaction is at least 100° C., it does not take long for the reaction to end, so from the aspect of productivity, this temperature is preferred. On the other hand, when the temperature of the imidization reaction is kept at 250° C. or lower, lowering of physical properties due to thermal degradation of the maleimide resin rarely occurs, and is therefore preferred.

When polymerizing by the subsequent imidization method, the unsaturated dicarboxylic anhydride and styrene monomer may be polymerized by adding the total amount during the initial stage of polymerization. However, since unsaturated dicarboxylic anhydride and styrene monomers have a strong tendency toward alternating copolymerization, an alternating copolymer with a composition of the unsaturated dicarboxylic anhydride and styrene monomer at a molar ratio of 1:1 will be generated during the initial stage of polymerization. In order to obtain the constituting units of the maleimide copolymer of the present embodiment, the styrene monomer needs to be at a higher molar ratio than the unsaturated dicarboxylic anhydride. Therefore, if polymerization is carried out with the total amount during the initial stage, a copolymer with more styrene monomer units tends to be generated during the later stages of polymerization, and as a consequence of which, the composition distribution will be large and when knead mixing with an ABS resin etc., there may be a lack of compatibility and the physical properties may not be favorable. For that reason, in order to obtain a copolymer with little composition distribution, polymerization is preferably carried out by using the total amount of the styrene monomer and a portion of the unsaturated dicarboxylic anhydride in the initial stage of polymerization and adding, continuously or in batches, the remainder of the unsaturated carboxlic anhydride. The ratio of the amount of the unsaturated dicarboxylic anhydride used in the initial stage of polymerization and the amount added continuously or in batches is preferably 5/95 to 50/50 and more preferably 10/90 to 25/75. As long as the ratio of the amount of the unsaturated dicarboxylic anhydride used in the initial stage of polymerization and the amount added continuously or in batches is within these ranges, a maleimide copolymer with little composition distribution and excellent compatability with AS resins, ABS resins, AES resins and AAS resins etc. can be obtained, and therefore if these resins are used as heat-resistance imparting materials, there is the advantage of being capable of obtaining heat-resistant resin compositions with a particularly excellent balance of physical properties and beautiful appearance when molded.

The reaction rate of polymerization and the degree of conversion can be controlled by controlling the polymerization temperature, polymerization time, amount of polymerization initiator and rate of adding monomers. Since the residual maleimide monomer content in the maleimide copolymer of the present embodiment is at most 300 ppm, conditions are preferably adjusted such that the degree of conversion of the maleimide monomer is at least 99.9% in the direct method and the degree of conversion of the unsaturated dicarboxylic anhydride is at least 99.9% in the subsequent imidization method. For example, in the case of the subsequent imidization method, the initial polymerization temperature is preferably 80 to 110° C., and in order to enhance the degree of conversion, is preferably 110° C. to 150° C. in the later stage of polymerization. Additionally, the rate of adding the unsaturated dicarboxylic acid is preferably adjusted so that the addition is finished when the degree of conversion of the styrene monomer is 80 to 95%. Further, the degree of conversion of the unsaturated dicarboxylic anhydride can be made at least 99.9% by adjusting the polymerization time and the amount of the polymerization initiator. Moreover, when the residual maleimide monomer content in the maleimide copolymer of the present embodiment is at most 300 ppm (equivalent to a degree of conversion of at least 99.9%), there is the advantage of being capable of obtaining a maleimide copolymer with an excellent hue, which, when used as a heat-resistance imparting material in an ABS resin to produce a heat-resistant resin composition, allows a composition with a good hue to be achieved.

Moreover, there are no particular limitations on the method of removing volatile components such as unreacted monomers or non-polymerizable solvents used for polymerization, and a conventionally known method may be used. However, as a method that can be adopted on an industrial scale, a method employing a vent-type screw extruder is preferred. As the devolatilization conditions when using a vent-type screw extruder, devolatilization is preferably carried out at a resin temperature of 310 to 340° C. under a reduced pressure of −92 kPaG or lower. While non-polymerizable solvents and unreacted monomers volatilize easily under a vacuum reduced pressure and high resin temperature, as long as the resin temperature is kept at 340° C. or lower, the maleimide copolymer will hardly depolymerize due to thermal degradation, so it is difficult for the residual maleimide monomer content to increase and the object of obtaining a maleimide copolymer with an excellent hue, a high heat-resistance imparting effect and an excellent kneadability might not be achievable. Additionally, the resin temperature may be adjusted by adjusting the number of rotations of the screw or the temperature of the cylinder of the extruder.

Additionally, in the present embodiment, in order to suppress the amount of maleimide monomer generated by thermal degradation, a radical scavenger may be used. While the radical scavenger used in the present embodiment is not particularly limited, antioxidants such as phenol compounds, organic phosphorus compounds, organic sulfur compounds and amine compound may be mentioned. These radical scavengers may be used alone or in a combination of two or more. Since the radical scavenger is subject to a significant thermal history during the process of devolatilizing the volatile component in the maleimide copolymer by a vent-type screw extruder, in order to maintain the function as a radical scavenger, compounds with a heat-resistance or thermal stability are particularly preferred. For example, radical scavengers with a 1% heating loss temperature exceeding 300° C. are further preferred. The radical scavenger used in the present embodiment is preferably added to a polymerization product after polymerization. If added before polymerization or during polymerization, the polymerization rate may be reduced.

<Heat-resistant Resin Composition>

The present embodiment relates to a heat-resistant resin composition obtained by knead mixing the maleimide copolymer with one or more resins selected from the group consisting of ABS resins, AS resins, AES resins and AAS resins.

While the maleimide copolymer obtained by the above-given method for producing a maleimide copolymer can be used as a heat-resistance imparting agent for various resins, since it has an excellent compatibility with styrene/acrylonitrile copolymer resins (AS resins), acrylonitrile/butadiene/styrene copolymer resins (ABS resins), acrylonitrile/acrylic rubber/styrene copolymer resins (AAS resins), and acrylonitrile-ethylene/propylene rubber-styrene copolymer resins (AES resins) among them, resin compositions obtained by knead mixing with these resins provide particularly high heat resisting effects. Additionally, when knead mixing the maleimide copolymer of the present embodiment with these resins, a stabilizer, ultraviolet absorber, fire retardant, plasticizer, lubricant, glass fiber, inorganic filler, colorant or anti-static agent may be further added.

Additionally, the maleimide copolymer etc. explained with reference to the above aspects and embodiments do not limit the present invention and have been disclosed with the intention to illustrate. The technical scope of the present invention is defined by the recitations of the claims, and those skilled in the art will be able to make various design modifications within the technical scope of the invention as recited in the claims.

EXAMPLES

Herebelow, the present invention shall be further explained with reference to the examples, but the present invention is not limited thereby.

Example 1

After placing 65 parts by mass of styrene, 7 parts by mass of maleic anhydride, 0.2 parts by mass of 2,4-diphenyl-4-methyl-1-pentene and 25 parts by mass of methyl ethyl ketone in an autoclave with a volume of approximately 25 liters equipped with a mixer and flushing the inside of the system with nitrogen gas, the temperature was increased to 92° C., and a solution in which 28 parts by mass of maleic anhydride and 0.18 parts by mass of t-butyl peroxy-2-ethylhexanoate were dissolved in 100 parts by mass of methyl ethyl ketone was added continuously over 7 hours. After the addition, 0.03 parts by mass of t-butyl peroxy-2-ethylhexanoate was further added, the temperature was increased to 120° C., and the reaction was carried out for one more hour to obtain a styrene/maleic anhydride copolymer. A part of the viscous resin liquid was sampled and unreacted maleic anhydride was quantified by liquid chromatography to calculate the degree of conversion of maleic anhydride. The degree of maleic anhydride was 99.93%. Then 32 parts by mass of aniline and 0.6 parts by mass of triethylamine were added to the viscous resin liquid and allowed to react for 7 hours at 140° C. The imidization reaction liquid after the reaction was completed was put in a vent-type screw extruder and the volatile components were removed to obtain a pellet-shaped maleimide copolymer A-1. The resin temperature when devolatilizing was 328° C. and the vent pressure was −97 kPaG. The analysis results of the obtained maleimide copolymer A-1 are shown in Table 1.

Example 2

After placing 65 parts by mass of styrene, 7 parts by mass of maleic anhydride, 0.3 parts by mass of 2,4-diphenyl-4-methyl-1-pentene and 25 parts by mass of methyl ethyl ketone in an autoclave with a volume of approximately 25 liters equipped with a mixer and flushing the inside of the system with nitrogen gas, the temperature was increased to 92° C., and a solution in which 28 parts by mass of maleic anhydride and 0.18 parts by mass of t-butyl peroxy-2-ethylhexanoate were dissolved in 100 parts by mass of methyl ethyl ketone was added continuously over 7 hours. After the addition, 0.03 parts by mass of t-butyl peroxy-2-ethylhexanoate was further added, the temperature was increased to 120° C., and the reaction was carried out for one more hour to obtain a styrene/maleic anhydride copolymer. A part of the viscous resin liquid was sampled and unreacted maleic anhydride was quantified by liquid chromatography to calculate the degree of conversion of maleic anhydride. The degree of conversion of maleic anhydride was 99.92%. Then 32 parts by mass of aniline and 0.6 parts by mass of triethylamine were added to the viscous resin liquid and allowed to react for 7 hours at 140° C. The imidization reaction liquid after the reaction was completed was put in a vent-type screw extruder and the volatile components were removed to obtain a pellet-shaped maleimide copolymer A-2. The resin temperature when devolatilizing was 327° C. and the vent pressure was −97 kPaG. The analysis results of the obtained maleimide copolymer A-2 are shown in Table 1.

Example 3

After placing 68 parts by mass of styrene, 7 parts by mass of maleic anhydride, 0.2 parts by mass of 2,4-diphenyl-4-methyl-1-pentene and 25 parts by mass of methyl ethyl ketone in an autoclave with a volume of approximately 25 liters equipped with a mixer and flushing the inside of the system with nitrogen gas, the temperature was increased to 93° C., and a solution in which 28 parts by mass of maleic anhydride and 0.18 parts by mass of t-butyl peroxy-2-ethylhexanoate were dissolved in 100 parts by mass of methyl ethyl ketone was added continuously over 7 hours. After the addition, 0.03 parts by mass of t-butyl peroxy-2-ethylhexanoate was further added, the temperature was increased to 120° C., and the reaction was carried out for one more hour to obtain a styrene/maleic anhydride copolymer. A part of the viscous resin liquid was sampled and unreacted maleic anhydride was quantified by liquid chromatography to calculate the degree of conversion of maleic anhydride. The degree of conversion of maleic anhydride was 99.94%. Then 24 parts by mass of aniline and 0.6 parts by mass of triethylamine were added to the viscous resin liquid and allowed to react for 7 hours at 140° C. The imidization reaction liquid after the reaction was completed was put in a vent-type screw extruder and the volatile components were removed to obtain a pellet-shaped maleimide copolymer A-3. The resin temperature when devolatilizing was 324° C. and the vent pressure was −97 kPaG. The analysis results of the obtained maleimide copolymer A-3 are shown in Table 1.

Example 4

After placing 70 parts by mass of styrene, 6 parts by mass of maleic anhydride, 0.2 parts by mass of 2,4-diphenyl-4-methyl-1-pentene and 25 parts by mass of methyl ethyl ketone in an autoclave with a volume of approximately 25 liters equipped with a mixer and flushing the inside of the system with nitrogen gas, the temperature was increased to 94° C., and a solution in which 24 parts by mass of maleic anhydride and 0.18 parts by mass of t-butyl peroxy-2-ethylhexanoate were dissolved in 100 parts by mass of methyl ethyl ketone was added continuously over 7 hours. After the addition, 0.03 parts by mass of t-butyl peroxy-2-ethylhexanoate was further added, the temperature was increased to 120° C., and the reaction was carried out for one more hour to obtain a styrene/maleic anhydride copolymer. A part of the viscous resin liquid was sampled and unreacted maleic anhydride was quantified by liquid chromatography to calculate the degree of conversion of maleic anhydride. The degree of conversion of maleic anhydride was 99.95%. Then 21 parts by mass of aniline and 0.6 parts by mass of triethylamine were added to the viscous resin liquid and allowed to react for 7 hours at 140° C. The imidization reaction liquid after the reaction was completed was put in a vent-type screw extruder and the volatile components were removed to obtain a pellet-shaped maleimide copolymer A-4. The resin temperature when devolatilizing was 322° C. and the vent pressure was −97 kPaG. The analysis results of the obtained maleimide copolymer A-4 are shown in Table 1.

Example 5

After placing 65 parts by mass of styrene, 7 parts by mass of maleic anhydride, 0.5 parts by mass of 2,4-diphenyl-4-methyl-1-pentene and 25 parts by mass of methyl ethyl ketone in an autoclave with a volume of approximately 25 liters equipped with a mixer and flushing the inside of the system with nitrogen gas, the temperature was increased to 92° C., and a solution in which 28 parts by mass of maleic anhydride and 0.18 parts by mass of t-butyl peroxy-2-ethylhexanoate were dissolved in 100 parts by mass of methyl ethyl ketone was added continuously over 7 hours. After the addition, 0.03 parts by mass of t-butyl peroxy-2-ethylhexanoate was further added, the temperature was increased to 120° C., and the reaction was carried out for one more hour to obtain a styrene/maleic anhydride copolymer. A part of the viscous resin liquid was sampled and unreacted maleic anhydride was quantified by liquid chromatography to calculate the degree of conversion of maleic anhydride. The degree of conversion of maleic anhydride was 99.90%. Then 32 parts by mass of aniline and 0.6 parts by mass of triethylamine were added to the viscous resin liquid and allowed to react for 7 hours at 140° C. The imidization reaction liquid after the reaction was completed was put in a vent-type screw extruder and the volatile components were removed to obtain a pellet-shaped maleimide copolymer A-5. The resin temperature when devolatilizing was 325° C. and the vent pressure was −97 kPaG. The analysis results of the obtained maleimide copolymer A-5 are shown in Table 1.

Example 6

After placing 65 parts by mass of styrene, 7 parts by mass of maleic anhydride, 0.2 parts by mass of 2,4-diphenyl-4-methyl-1-pentene and 25 parts by mass of methyl ethyl ketone in an autoclave with a volume of approximately 25 liters equipped with a mixer and flushing the inside of the system with nitrogen gas, the temperature was increased to 92° C., and a solution in which 28 parts by mass of maleic anhydride and 0.18 parts by mass of t-butyl peroxy-2-ethylhexanoate were dissolved in 100 parts by mass of methyl ethyl ketone was added continuously over 7 hours. After the addition, 0.03 parts by mass of t-butyl peroxy-2-ethylhexanoate was further added, the temperature was increased to 120° C., and the reaction was carried out for one more hour to obtain a styrene/maleic anhydride copolymer. A part of the viscous resin liquid was sampled and unreacted maleic anhydride was quantified by liquid chromatography to calculate the degree of conversion of maleic anhydride. The degree of conversion of maleic anhydride was 99.93%. Then 32 parts by mass of aniline and 0.6 parts by mass of triethylamine were added to the viscous resin liquid and allowed to react for 7 hours at 140° C. The imidization reaction liquid after the reaction was completed was put in a vent-type screw extruder and the volatile components were removed to obtain a pellet-shaped maleimide copolymer A-6. The resin temperature when devolatilizing was 330° C. and the vent pressure was −90 kPaG. The analysis results of the obtained maleimide copolymer A-6 are shown in Table 1.

TABLE 1

| | | maleimide copolymer | | Ex. 1<br>A-1 | Ex. 2<br>A-2 | Ex. 3<br>A-3 | Ex. 4<br>A-4 | Ex. 5<br>A-5 | Ex. 6<br>A-6 |
|---|---|---|---|---|---|---|---|---|---|
| polymerization proportion | initial stage | styrene monomer | parts by mass | 65 | 65 | 68 | 70 | 65 | 65 |
| | | unsaturated dicarboxylic anhydride monomer | parts by mass | 7 | 7 | 7 | 6 | 7 | 7 |
| | | non-polymerizable solvent | parts by mass | 25 | 25 | 25 | 25 | 25 | 25 |
| | batch addition | unsaturated dicarboxylic anhydride monomer | parts by mass | 28 | 28 | 25 | 24 | 28 | 28 |
| | | non-polymerizable solvent | parts by mass | 100 | 100 | 100 | 100 | 100 | 100 |

TABLE 1-continued

| | maleimide copolymer | | Ex. 1 A-1 | Ex. 2 A-2 | Ex. 3 A-3 | Ex. 4 A-4 | Ex. 5 A-5 | Ex. 6 A-6 |
|---|---|---|---|---|---|---|---|---|
| | amount of unreacted unsaturated dicarboxylic anhydride monomer | ppm | 110 | 120 | 90 | 70 | 150 | 110 |
| | degree of conversion of unsaturated dicarboxylic anhydride monomer | % | 99.93 | 99.92 | 99.94 | 99.95 | 99.90 | 99.93 |
| | resin temperature when devolatilizing | °C. | 328 | 327 | 324 | 322 | 325 | 330 |
| | vent pressure | kPaG | −97 | −97 | −97 | −97 | −97 | −90 |
| constituting units | styrene monomer unit | mass % | 51.1 | 51.0 | 56.6 | 59.9 | 51.0 | 51.1 |
| | maleimide monomer unit | mass % | 48.1 | 48.2 | 38.7 | 33.4 | 48.2 | 48.1 |
| | unsaturated dicarboxylic anhydride monomer unit | mass % | 0.8 | 0.8 | 4.7 | 6.7 | 0.8 | 0.8 |
| | weight average molecular weight (Mw) | ×10$^4$ | 12.7 | 10.5 | 12.8 | 12.9 | 9.3 | 12.7 |
| | residual maleimide monomer content | ppm | 170 | 180 | 150 | 130 | 200 | 260 |
| | glass transition temperature | °C. | 188 | 188 | 180 | 170 | 188 | 186 |
| | yellowness | — | 1.6 | 1.6 | 1.7 | 1.9 | 1.8 | 2.2 |
| | melt viscosity | poise | 1400 | 1200 | 1100 | 800 | 1000 | 1500 |

Comparative Example 1

After placing 60 parts by mass of styrene, 8 parts by mass of maleic anhydride, 0.2 parts by mass of 2,4-diphenyl-4-methyl-1-pentene and 25 parts by mass of methyl ethyl ketone in an autoclave with a volume of approximately 25 liters equipped with a mixer and flushing the inside of the system with nitrogen gas, the temperature was increased to 92° C., and a solution in which 32 parts by mass of maleic anhydride and 0.18 parts by mass of t-butyl peroxy-2-ethylhexanoate were dissolved in 100 parts by mass of methyl ethyl ketone was added continuously over 7 hours. After the addition, 0.03 parts by mass of t-butyl peroxy-2-ethylhexanoate was further added, the temperature was increased to 120° C., and the reaction was carried out for one more hour to obtain a styrene/maleic anhydride copolymer. A part of the viscous resin liquid was sampled and unreacted maleic anhydride was quantified by liquid chromatography to calculate the degree of conversion of maleic anhydride. The degree of conversion of maleic anhydride was 99.82%. Then 37 parts by mass of aniline and 0.6 parts by mass of triethylamine were added to the viscous resin liquid and allowed to react for 7 hours at 140° C. The imidization reaction liquid after the reaction was completed was put in a vent-type screw extruder and the volatile components were removed to obtain a pellet-shaped maleimide copolymer A-7. The resin temperature when devolatilizing was 335° C. and the vent pressure was −97 kPaG. The analysis results of the obtained maleimide copolymer A-7 are shown in Table 2.

Comparative Example 2

After placing 75 parts by mass of styrene, 5 parts by mass of maleic anhydride, 0.2 parts by mass of 2,4-diphenyl-4-methyl-1-pentene and 25 parts by mass of methyl ethyl ketone in an autoclave with a volume of approximately 25 liters equipped with a mixer and flushing the inside of the system with nitrogen gas, the temperature was increased to 96° C., and a solution in which 20 parts by mass of maleic anhydride and 0.18 parts by mass of t-butyl peroxy-2-ethylhexanoate were dissolved in 100 parts by mass of methyl ethyl ketone was added continuously over 7 hours. After the addition, 0.03 parts by mass of t-butyl peroxy-2-ethylhexanoate was further added, the temperature was increased to 120° C., and the reaction was carried out for one more hour to obtain a styrene/maleic anhydride copolymer. A part of the viscous resin liquid was sampled and unreacted maleic anhydride was quantified by liquid chromatography to calculate the degree of conversion of maleic anhydride. The degree of conversion of maleic anhydride was 99.96%. Then 22 parts by mass of aniline and 0.6 parts by mass of triethylamine were added to the viscous resin liquid and allowed to react for 7 hours at 140° C. The imidization reaction liquid after the reaction was completed was put in a vent-type screw extruder and the volatile components were removed to obtain a pellet-shaped maleimide copolymer A-8. The resin temperature when devolatilizing was 320° C. and the vent pressure was −97 kPaG. The analysis results of the obtained maleimide copolymer A-8 are shown in Table 2.

Comparative Example 3

After placing 65 parts by mass of styrene, 7 parts by mass of maleic anhydride, 0.2 parts by mass of 2,4-diphenyl-4-methyl-1-pentene and 25 parts by mass of methyl ethyl ketone in an autoclave with a volume of approximately 25 liters equipped with a mixer and flushing the inside of the system with nitrogen gas, the temperature was increased to 92° C., and a solution in which 28 parts by mass of maleic anhydride and 0.18 parts by mass of t-butyl peroxy-2-ethylhexanoate were dissolved in 100 parts by mass of methyl ethyl ketone was added continuously over 7 hours. After the addition, 0.03 parts by mass of t-butyl peroxy-2-ethylhexanoate was further added, the temperature was increased to 120° C., and the reaction was carried out for one more hour to obtain a styrene/maleic anhydride copolymer. A part of the viscous resin liquid was sampled and unreacted maleic anhydride was quantified by liquid chromatography to calculate the degree of conversion of maleic anhydride. The degree of conversion of maleic anhydride was 99.93%. Then 16 parts by mass of aniline and 0.6 parts by mass of triethylamine were added to the viscous resin liquid and allowed to react for 7 hours at 140° C. The imidization reaction liquid after the reaction was completed was put in a vent-type screw extruder and the volatile components were removed to obtain a pellet-shaped maleimide copolymer A-9. The resin temperature when devolatilizing was 328° C. and the vent pressure was −97 kPaG. The analysis results of the obtained maleimide copolymer A-9 are shown in Table 2.

Comparative Example 4

After placing 65 parts by mass of styrene, 7 parts by mass of maleic anhydride, 1.0 parts by mass of 2,4-diphenyl-4-methyl-1-pentene and 25 parts by mass of methyl ethyl ketone in an autoclave with a volume of approximately 25 liters equipped with a mixer and flushing the inside of the system with nitrogen gas, the temperature was increased to 92° C., and a solution in which 28 parts by mass of maleic anhydride and 0.18 parts by mass of t-butyl peroxy-2-ethylhexanoate were dissolved in 100 parts by mass of methyl ethyl ketone was added continuously over 7 hours. After the addition, 0.03 parts by mass of t-butyl peroxy-2-ethylhexanoate was further added, the temperature was increased to 120° C., and the reaction was carried out for one more hour to obtain a styrene/maleic anhydride copolymer. A part of the viscous resin liquid was sampled and unreacted maleic anhydride was quantified by liquid chromatography to calculate the degree of conversion of maleic anhydride. The degree of conversion of maleic anhydride was 99.88%. Then 32 parts by mass of aniline and 0.6 parts by mass of triethylamine were added to the viscous resin liquid and allowed to react for 7 hours at 140° C. The imidization reaction liquid after the reaction was completed was put in a vent-type screw extruder and the volatile components were removed to obtain a pellet-shaped maleimide copolymer A-10. The resin temperature when devolatilizing was 325° C. and the vent pressure was −97 kPaG. The analysis results of the obtained maleimide copolymer A-10 are shown in Table 2.

Comparative Example 5

After placing 65 parts by mass of styrene, 7 parts by mass of maleic anhydride, 0.1 parts by mass of 2,4-diphenyl-4-methyl-1-pentene and 25 parts by mass of methyl ethyl ketone in an autoclave with a volume of approximately 25 liters equipped with a mixer and flushing the inside of the system with nitrogen gas, the temperature was increased to 92° C., and a solution in which 28 parts by mass of maleic anhydride and 0.18 parts by mass of t-butyl peroxy-2-ethylhexanoate were dissolved in 100 parts by mass of methyl ethyl ketone was added continuously over 7 hours. After the addition, 0.03 parts by mass of t-butyl peroxy-2-ethylhexanoate was further added, the temperature was increased to 120° C., and the reaction was carried out for one more hour to obtain a styrene/maleic anhydride copolymer. A part of the viscous resin liquid was sampled and unreacted maleic anhydride was quantified by liquid chromatography to calculate the degree of conversion of maleic anhydride. The degree of conversion of maleic anhydride was 99.93%. Then 32 parts by mass of aniline and 0.6 parts by mass of triethylamine were added to the viscous resin liquid and allowed to react for 7 hours at 140° C. The imidization reaction liquid after the reaction was completed was put in a vent-type screw extruder and the volatile components were removed to obtain a pellet-shaped maleimide copolymer A-11. The resin temperature when devolatilizing was 345° C. and the vent pressure was −97 kPaG. The analysis results of the obtained maleimide copolymer A-11 are shown in Table 2.

Comparative Example 6

After placing 65 parts by mass of styrene, 0.3 parts by mass of 2,4-diphenyl-4-methyl-1-pentene and 25 parts by mass of methyl ethyl ketone in an autoclave with a volume of approximately 25 liters equipped with a mixer and flushing the inside of the system with nitrogen gas, the temperature was increased to 92° C., and a solution in which 35 parts by mass of maleic anhydride and 0.18 parts by mass of t-butyl peroxy-2-ethylhexanoate were dissolved in 100 parts by mass of methyl ethyl ketone was added continuously over 7 hours. After the addition, 0.03 parts by mass of t-butyl peroxy-2-ethylhexanoate was further added, the temperature was increased to 120° C., and the reaction was carried out for one more hour to obtain a styrene/maleic anhydride copolymer. A part of the viscous resin liquid was sampled and unreacted maleic anhydride was quantified by liquid chromatography to calculate the degree of conversion of maleic anhydride. The degree of conversion of maleic anhydride was 97.9%. Then 32 parts by mass of aniline and 0.6 parts by mass of triethylamine were added to the viscous resin liquid and allowed to react for 7 hours at 140° C. The imidization reaction liquid after the reaction was completed was put in a vent-type screw extruder and the volatile components were removed to obtain a pellet-shaped maleimide copolymer A-12. The resin temperature when devolatilizing was 327° C. and the vent pressure was −97 kPaG. The analysis results of the obtained maleimide copolymer A-12 are shown in Table 2.

TABLE 2

| | maleimide copolymer | | | Comp. Ex. 1 A-7 | Comp. Ex. 2 A-8 | Comp. Ex. 3 A-9 | Comp. Ex. 4 A-10 | Comp. Ex. 5 A-11 | Comp. Ex. 6 A-12 |
|---|---|---|---|---|---|---|---|---|---|
| polymerization proportion | initial stage | styrene monomer | parts by mass | 60 | 75 | 65 | 65 | 65 | 65 |
| | | unsaturated dicarboxylic anhydride monomer | parts by mass | 8 | 5 | 7 | 7 | 7 | 0 |
| | | non-polymerizable solvent | parts by mass | 25 | 25 | 25 | 25 | 25 | 25 |
| | batch addition | unsaturated dicarboxylic anhydride monomer | parts by mass | 32 | 20 | 28 | 28 | 28 | 35 |
| | | non-polymerizable solvent | parts by mass | 100 | 100 | 100 | 100 | 100 | 100 |
| amount of unreacted unsaturated dicarboxylic anhydride monomer | | | ppm | 320 | 40 | 110 | 190 | 110 | 3200 |

TABLE 2-continued

| maleimide copolymer | | | Comp. Ex. 1 A-7 | Comp. Ex. 2 A-8 | Comp. Ex. 3 A-9 | Comp. Ex. 4 A-10 | Comp. Ex. 5 A-11 | Comp. Ex. 6 A-12 |
|---|---|---|---|---|---|---|---|---|
| | degree of conversion of unsaturated dicarboxylic anhydride monomer | % | 99.82 | 99.96 | 99.93 | 99.88 | 99.93 | 97.94 |
| | resin temperature when devolatilizing | °C. | 335 | 320 | 328 | 325 | 345 | 327 |
| | vent pressure | kPaG | −97 | −97 | −97 | −97 | −97 | −97 |
| constituting units | styrene monomer unit | mass % | 46.0 | 62.3 | 57.6 | 50.9 | 51.1 | 51.6 |
| | maleimide monomer unit | mass % | 53.1 | 36.2 | 26.3 | 48.3 | 48.1 | 47.6 |
| | unsaturated dicarboxylic anhydride monomer unit | mass % | 0.9 | 1.5 | 16.1 | 0.8 | 0.8 | 0.8 |
| | weight average molecular weight (Mw) | ×10⁴ | 12.5 | 12.9 | 11.1 | 8.1 | 14.5 | 10.6 |
| | residual maleimide monomer content | ppm | 530 | 80 | 160 | 320 | 340 | 1200 |
| | glass transition temperature | °C. | 199 | 155 | 182 | 187 | 187 | 185 |
| | yellowness | — | 3.2 | 1.2 | 2.9 | 2.4 | 2.5 | 6.3 |
| | melt viscosity | poise | 2200 | 400 | 1200 | 800 | 2000 | 1200 |

The method for measuring each analytic value is as follows.

(1) Quantification of Unreacted Unsaturated Dicarboxylic Anhydride Monomer

Device name: LC-10 (manufactured by Shimadzu Corporation)
Wavelength for detector and analysis: UV 230 nm
Column: YMC YMC-PACK ODS-AA-312 (150 mm×6 mm 5 μm)
Mobile phase: $H_2O/CH_3OH$ 50/50 (pH 3.3 $H_3PO_4$)
Flow rate: 1 mml/min.
Injection volume: 20 μl
Procedure: Weigh out approximately 0.2 g of a sample in a 50 ml conical flask, and add 5 ml of 1,2-dichloroethane to dissolve it. Next, add 5 ml of n-hexane and shake for 10 to 15 min. on a shaker, precipitate the polymer and filter the supernatant by a 0.45 μm membrane filter. Add 3 ml each of the supernatant and pure water to a 10 ml graduated test tube, shake it for one hour and leave it for 30 min, then measure the lower layer using the above device. Additionally, the quantification method is to calculate from maleic anhydride standard solutions using the absolute calibration curve method.

(2) Calculation of Degree of Conversion of Unsaturated Dicarboxylic Anhydride Monomer Amount of unreacted unsaturated dicarboxylic anhydride monomer=a (ppm)
Concentration of unsaturated dicarboxylic anhydride monomer=b (%)
Amount of styrene monomer=c (parts by mass)
Amount of unsaturated dicarboxylic anhydride monomer=d (parts by mass)
Amount of non-polymerizable solvent=e (parts by mass)
b=d/(c+d+e)×100
Degree of conversion of unsaturated dicarboxylic anhydride monomer=(b−a/10000)/b×100

(3) Constituting Units of Maleimide Copolymer

NMR measurements were carried out under the below-given measurement conditions, and the constituting units of the maleimide copolymers were calculated from the ratio of the integral value of carbonyl carbon in the imide group to the integral value of carbonyl carbon of the maleamic acid intermediate in the imidization reaction and of unreacted dicarboxylic anhydride group.

Device name: AVANCE-300 (manufactured by Bruker Japan Co., Ltd.)
Measured nuclear species: $^{13}C$
Temperature: 110° C.
Concentration: 10 mass %
Solvent: DMSO-$d_6$
Number of integrations: 10,000

(4) Weight Average Molecular Weight (Mw)

The Mw of the present invention is the polystyrene-equivalent Mw measured by GPC, and was measured under the below-given measurement conditions.
Device name: SYSTEM-21 Shodex (manufactured by Showa Denko K. K.)
Column: three PL gel MIXED-B in series
Temperature: 40° C.
Detection: differential refractive index
Solvent: tetrahydrofuran
Concentration: 2 mass %
Standard Curve: generated using standard polystyrenes (PS) (manufactured by PL), polystyrene-equivalent Mw (5) Residual Maleimide Monomer Content Device name: GC-2010 (manufactured by Shimadzu Corporation)
Column: capillary column DB-5MS (phenylallene polymer)
Temperature: inlet 280° C., detector 280° C.
Programmed temperature analysis is performed at a (initial) column temperature of 80° C.
(Conditions for programmed temperature analysis)
80° C.: hold for 12 min.
80 to 280° C.: increase temperature at 20° C./min. for 10 min.
280° C.: hold for 10 min.
Detector: FID
Procedure: Dissolve 0.5 g of a sample in 5 ml of a 1,2-dichloroethane solution (0.014 g/L) containing undecane (internal standard material). Then add 5 ml n-hexane and shake for 10 to 15 min. using a shaker to precipitate. After precipitating and depositing the polymer, inject only the supernatant into the GC. From the obtained peak area of the maleimide monomer, a quantitative value was calculated using a coefficient obtained from the internal standard material.

(6) Glass Transition Temperature
Device name: Robot DSC6200 manufactured by Seiko Instruments Inc.
Rate of temperature increase: 10° C./min.
  Measurements were performed using the above device in accordance with JIS K-7121.
(7) Yellowness
Device name: SZ-IIΣ80 Color Meter (manufactured by Nippon Denshoku Industries Co., Ltd.)
Procedure: Dissolve 1 g of a sample in 25 ml tetrahydrofuran. After dissolving it, transfer it to a rectangular cell for measurement. The difference in color between the cell and a rectangular cell containing the tetrahydrofuran solution was obtained by the transmission method, and the value was used as yellowness.
(8) Melt Viscosity
Melt viscosity was measured under the below-given measurement conditions.
Device name: Capillary Rheometer (manufactured by Toyo Seiki Seisaku-sho, Ltd.)
Temperature: 280° C.
Shear rate: 100 sec$^{-1}$ Examples 7-14 and Comparative Examples 7-13
(Knead Mixing of Maleimide Copolymer and ABS Resin)

After blending maleimide copolymers A-1 to A12 with a generally commercially available ABS resin "GF-3000" (manufactured by Denki Kagaku Kogyo Kabushiki Kaisha) at the proportions shown in Table 3 and Table 4, they were extruded and made into pellets using a biaxial extruder (TEX-30α, manufactured by The Japan Steel Works, Ltd.) under the conditions shown in Table 3 and Table 4. The pellets were used to make test pieces by an injection molding machine, and each physical property was measured. The results are shown in Table 3 and Table 4.

TABLE 3

|  |  |  | Ex. 7 | Ex. 8 | Ex. 9 | Ex. 10 | Ex. 11 | Ex. 12 | Ex. 13 | Ex. 14 |
|---|---|---|---|---|---|---|---|---|---|---|
| compound ratio | maleimide copolymer A-1 |  | 15 | 15 |  |  |  |  |  |  |
|  | maleimide copolymer A-2 |  |  |  | 15 | 15 |  |  |  |  |
|  | maleimide copolymer A-3 |  |  |  |  |  | 15 |  |  |  |
|  | maleimide copolymer A-4 |  |  |  |  |  |  | 15 |  |  |
|  | maleimide copolymer A-5 |  |  |  |  |  |  |  | 15 |  |
|  | maleimide copolymer A-6 |  |  |  |  |  |  |  |  | 15 |
|  | ABS resin (GR-3000) |  | 85 | 85 | 85 | 85 | 85 | 85 | 85 | 85 |
| extrusion condition | cylinder temperature | ° C. | 250 | 250 | 250 | 250 | 250 | 250 | 250 | 250 |
|  | number of rotation of screw | rpm | 350 | 350 | 350 | 350 | 350 | 350 | 350 | 350 |
|  | discharge rate | kg/hr | 40 | 60 | 40 | 60 | 60 | 60 | 60 | 60 |
|  | resin temperature | ° C. | 283 | 278 | 284 | 276 | 276 | 275 | 276 | 278 |
| Charpy impact strength |  | kJ/m$^2$ | 24 | 24 | 23 | 23 | 23 | 21 | 21 | 23 |
| melt mass flow rate |  | g/10 min. | 5.5 | 5.4 | 6.3 | 6.2 | 6.3 | 7.4 | 7.1 | 5.9 |
| Vicat softening temperature |  | ° C. | 110 | 110 | 110 | 110 | 109 | 107 | 110 | 109 |
| hue (yellowness YI) |  | — | 8 | 7 | 8 | 7 | 9 | 11 | 10 | 13 |
| kneadability and appearance of molded product |  | — | ○ | ○ | ○ | ○ | ○ | ○ | ○ | ○ |

TABLE 4

|  |  | Comp. Ex. 7 | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|---|
| compound ratio | maleimide copolymer A-7 | 15 | 15 |  |  |  |  |  |
|  | maleimide copolymer A-8 |  |  | 15 |  |  |  |  |
|  | maleimide copolymer A-9 |  |  |  | 15 |  |  |  |
|  | maleimide copolymer A-10 |  |  |  |  | 15 |  |  |
|  | maleimide copolymer A-11 |  |  |  |  |  | 15 |  |
|  | maleimide copolymer A-12 |  |  |  |  |  |  | 15 |
|  | ABS resin (GR-3000) | 85 | 85 | 85 | 85 | 85 | 85 | 85 |

TABLE 4-continued

| | | | Comp. Ex. 7 | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|---|---|
| extrusion condition | cylinder temperature | °C. | 250 | 250 | 250 | 250 | 250 | 250 | 250 |
| | number of rotation of screw | rpm | 350 | 350 | 350 | 350 | 350 | 350 | 350 |
| | discharge rate | kg/hr | 40 | 40 | 60 | 60 | 60 | 40 | 60 |
| | resin temperature | °C. | 285 | 298 | 273 | 278 | 275 | 285 | 278 |
| Charpy impact strength | | kJ/m² | 19 | 21 | 18 | 22 | 18 | 20 | 23 |
| melt mass flow rate | | g/10 min | 4.6 | 5.1 | 7.7 | 6.5 | 8.1 | 4.8 | 6.2 |
| Vicat softening temperature | | °C. | 108 | 111 | 105 | 107 | 110 | 109 | 109 |
| hue (yellowness YI) | | — | 17 | 24 | 5 | 29 | 15 | 16 | 39 |
| kneadability and appearance of molded product | | — | x | ○ | ○ | x | ○ | x | ○ |

The method for measuring each physical property is as follows.

(1) Charpy Impact Strength

Notched Charpy impact strength was measured at a relative humidity of 50% and an atmospheric temperature of 23° C. in accordance with JIS K-7111.

(2) Melt Mass Flow Rate

Measurements were performed at a temperature of 220° C. and a load of 98 N in accordance with JIS K-7210.

(3) Vicat Softening Temperature

Measurements were performed at a load of 50 N in accordance with JIS K-7206.

(4) Hue

Plates (9 cm×5 cm) were molded at a molding temperature of 220° C. by an injection molding machine (IS-50EP, manufactured by Toshiba Machine Co., Ltd.) and yellowness YI was measured by a color meter (COLOR-7e2, manufactured by Kurabo Industries Ltd.).

(5) Kneadability and Appearance of Molded Products

Plates (9 cm×5 cm) were molded at a molding temperature of 220° C. by an injection molding machine (IS-50EP, manufactured by Toshiba Machine Co., Ltd.), and were evaluated as follows.

○: no molding defect and beautiful appearance of the molded product.

x: occurrence of silver hairlines due to poor distribution or degradation gas

<Result Assessment>

From the results of the above Table 1 to Table 4, the following observations can be made. That is, the maleimide copolymers of Examples 1 to 6 have extremely low residual maleimide monomer contents and low yellowness. Further, since the weight average molecular weight, glass transition temperature and melt viscosity were within the specified numerical ranges, the heat resistant resin compositions of Examples 7 to 14 in which these maleimide copolymers were knead mixed with an ABS resin had good hues, an excellent balance of the physical properties of heat resistance, impact resistance and fluidity, and good kneadability, so the appearance of the molded products was beautiful. Moreover, the matrix resin of the ABS resin was an AS resin, so the maleimide copolymers of Examples 1 to 6 can be expected to provide similar effects even with AS resins, or AES or AAS resins wherein AS resins are the matrix resins.

On the other hand, the maleimide copolymers of Comparative Examples 1 to 6 are outside the above specified numerical ranges for either the constitution of monomer units, weight average molecular weight or residual maleimide monomer content, and for that reason, the heat resistant resin compositions of Comparative Examples 7 to 13 in which these maleimide copolymers were knead mixed with an ABS resin had defects such as inadequate hue, poor balance of the physical properties of heat resistance, impact resistance and fluidity, or poor kneadability.

The present invention has been explained above with reference to examples. These examples are only exemplifications, and those skilled in the art will understand that various modifications are possible and such modifications are also within the scope of the present invention.

The invention claimed is:

1. A maleimide copolymer comprising 50 to 60 mass % of a styrene monomer unit, 30 to 49.5 mass % of a maleimide monomer unit and 0.5 to 6 mass% of an unsaturated dicarboxylic anhydride monomer unit; the copolymer having a weight average molecular weight (Mw) of 90,000 to 130,000 and a residual maleimide monomer content of 300 ppm or lower.

2. The maleimide copolymer according to claim 1, comprising 50 to 59 mass % of the styrene monomer unit, 35 to 49.5 mass % of the maleimide monomer unit and 0.5 to 6 mass % of the unsaturated dicarboxylic anhydride monomer unit.

3. The maleimide copolymer according to claim 1, having a glass transition temperature within a range of 175 to 190° C.

4. A method for producing a maleimide copolymer according to claim 1, comprising:

a step of generating a styrene/unsaturated dicarboxylic anhydride copolymer by polymerization by adding, to a mixed solution mainly comprising a total amount of the styrene monomer and a portion of the unsaturated dicarboxylic anhydride, continuously or in batches, the remainder of the unsaturated carboxlic anhydride; and a step of generating a maleimide copolymer by imidizing the styrene/unsaturated dicarboxylic anhydride copolymer by a primary amine.

5. The method for producing a maleimide copolymer according to claim 4, wherein the styrene/unsaturated dicarboxylic anhydride copolymer is obtained by solution polymerization in a non-polymerizable solvent, and the rate of polymerization of the unsaturated dicarboxylic anhydride monomer is at least 99.9%.

6. The method for producing a maleimide copolymer according to claim 4, further comprising a step of devolatilizing the mixed solution comprising the maleimide copolymer after the reaction using a vent-type screw extruder at a resin temperature of 310 to 340° C. under a reduced pressure of −92 kPaG or lower.

7. A heat-resistant resin composition comprising the maleimide copolymer comprising 50 to 60 mass % of a styrene monomer unit, 30 to 49.5 mass % of a maleimide monomer unit and 0.5 to 6 mass % of an unsaturated dicarboxylic anhydride monomer unit; the copolymer having a weight average molecular weight (Mw) of 90,000 to 130,000 and a residual maleimide monomer content of 300 ppm or lower; and one or more resins selected from the group consisting of ABS resins, AS resins, AES resins and AAS resins.

\* \* \* \* \*